(12) United States Patent
Zhao et al.

(10) Patent No.: US 9,394,933 B2
(45) Date of Patent: Jul. 19, 2016

(54) FASTENER, LIGHT SOURCE MODULE, AND METHOD OF ASSEMBLING A LIGHT SOURCE MODULE

(71) Applicant: Radiant Opto-Electronics (Suzhou) Co., Ltd., Wujiang, Jiangsu Province (CN)

(72) Inventors: Yong-Wei Zhao, Kaohsiung (TW); Hao-Ling Yen, Kaohsiung (TW); Shih-Hsien Chen, Kaohsiung (TW)

(73) Assignee: Radiant Opto-Electronics (Suzhou) Co., Ltd. (CN)

( * ) Notice: Subject to any disclaimer, the term of this patent is extended or adjusted under 35 U.S.C. 154(b) by 254 days.

(21) Appl. No.: 14/174,207

(22) Filed: Feb. 6, 2014

(65) Prior Publication Data

US 2015/0023018 A1     Jan. 22, 2015

(30) Foreign Application Priority Data

Jul. 19, 2013    (TW) .............................. 102125919 A (51) Int. Cl.
| | |
|---|---|
| *F21K 99/00* | (2016.01) |
| *F21S 4/00* | (2016.01) |
| *F16B 19/00* | (2006.01) |
| *G02F 1/1335* | (2006.01) |
| *F16B 19/10* | (2006.01) |
| *F16B 11/00* | (2006.01) |
| *F16B 1/00* | (2006.01) |

(52) U.S. Cl.
CPC .............. *F16B 19/002* (2013.01); *F16B 19/10* (2013.01); *G02F 1/133608* (2013.01); *F16B 11/006* (2013.01); *F16B 2001/0035* (2013.01); *G02F 1/133615* (2013.01); *Y10T 29/4913* (2015.01)

(58) Field of Classification Search
CPC ................... G02F 1/133608; G02F 1/133615; G02F 1/133308; G02F 2201/46; F16B 19/002; F16B 11/006; F16B 19/10; F16B 2001/0035
USPC ........ 362/600, 613, 630–634; 349/58, 60, 62, 349/65
See application file for complete search history.

(56) References Cited

U.S. PATENT DOCUMENTS

| | | | |
|---|---|---|---|
| 8,421,948 B2* | 4/2013 | Park .................. | G02F 1/133603 349/58 |
| 8,439,551 B2* | 5/2013 | Cho ...................... | G02B 6/0091 362/609 |
| 2003/0147715 A1 | 8/2003 | Curley, Jr. et al. | |

(Continued)

FOREIGN PATENT DOCUMENTS

| | | |
|---|---|---|
| CN | 201671932 U | 12/2010 |
| CN | 102478163 A | 5/2012 |

(Continued)

OTHER PUBLICATIONS

Search Report for Corresponding Chinese Patent Application No. 2013103056907 dated Oct. 28, 2014.

(Continued)

*Primary Examiner* — Anh Mai
*Assistant Examiner* — Arman B Fallahkhair
(74) *Attorney, Agent, or Firm* — Pepper Hamilton LLP (57) ABSTRACT

A fastener includes a head portion and a shank portion that extends from the head portion. The shank portion has a distal end that is distal from the head portion and that is formed with at least two bendable anchor segments. The fastener is used to fasten a base plate of a light emitting bar to a base of a light source module.

7 Claims, 12 Drawing Sheets

(56) References Cited

U.S. PATENT DOCUMENTS

| | | |
|---|---|---|
| 2008/0304259 A1 | 12/2008 | Teng |
| 2012/0293729 A1* | 11/2012 | Yoshikawa ........... G02B 6/0068 348/739 |

FOREIGN PATENT DOCUMENTS

| | | |
|---|---|---|
| CN | 202209645 U | 5/2012 |
| CN | 103104857 A | 5/2013 |
| JP | 6-10765 A | 1/1994 |
| JP | 2013062061 A | 4/2013 |
| TW | 201204982 A1 | 2/2012 |
| TW | 201237506 A1 | 9/2012 |
| TW | I377402 U | 11/2012 |

OTHER PUBLICATIONS

Search Report for corresponding Taiwan Application No. 102125919 dated May 6, 2015.

* cited by examiner

FASTENER, LIGHT SOURCE MODULE, AND METHOD OF ASSEMBLING A LIGHT SOURCE MODULE

CROSS-REFERENCE TO RELATED APPLICATION

This application claims priority of Taiwanese application no. 102125919, filed on Jul. 19, 2013.

BACKGROUND OF THE INVENTION

1. Field of the Invention

The present invention relates to a fastener, a light source module, and a method of assembling a light source module.

2. Description of the Related Art

Light-emitting diodes (LED) have advantages of low power consumption, wide color gamut, and high light directivity. Therefore, in recent years, light-emitting diodes are becoming increasingly important in related fields of lighting and optoelectronic industries and are being applied widely, especially in the field of liquid crystal displays.

Figure 1:
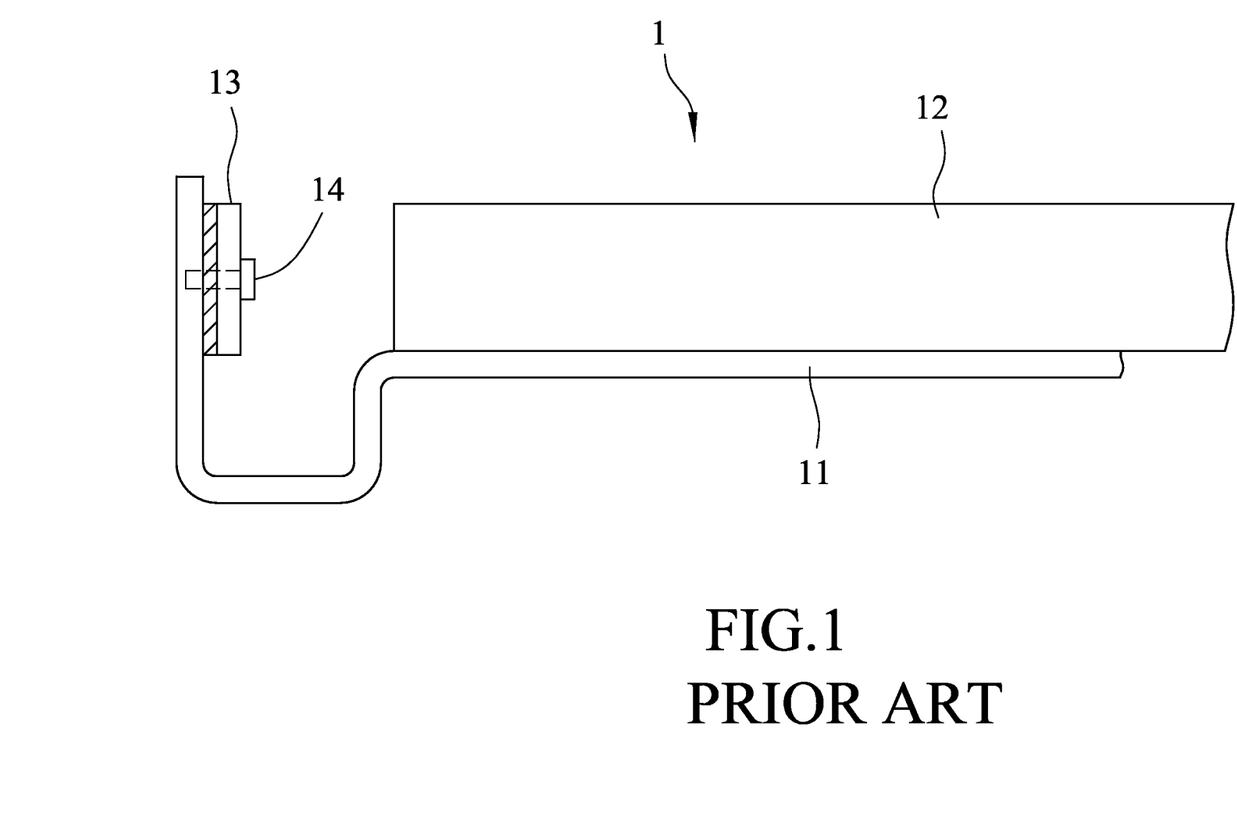
FIG. 1 is a partly cross-sectional view illustrating an edge-type backlight module disclosed in Taiwanese patent publication no. 201237506.

In a liquid crystal display, a backlight module uses light-emitting diodes as a light source, and can be classified as a direct-lit backlight module or an edge-type backlight module according to arrangements of the light-emitting diodes. FIG. 1 shows an edge-type backlight module 1 disclosed in Taiwanese patent publication no. 201237506. The backlight module 1 includes a back plate 11, a light guiding plate 12 connected to the back plate 11, a light-emitting diode (LED) light bar 13 disposed on the back plate 11 and capable of emitting light in the direction of the light guiding plate 12, and a retaining member 14 that penetrates the LED light bar 13 for retaining the LED light bar 13 onto the back plate 11.

During the assembly process of the conventional backlight module 1, corresponding drill holes are made in the LED light bar 13 and the back plate 11. Then, the retaining member 14 is passed through the holes for retaining the LED light bar 13 on the back plate 11, thus completing the assembly of the backlight module 1. Screw is commonly used for the retaining member 14, and the LED light bar 13 is thus retained by screwing. However, screwing with the use of the retaining member 14 creates metal debris that are not only difficult to remove, but may also cause damage to the light-emitting diodes, affecting luminous efficiency of the light-emitting diodes, and may even cause situations of short circuiting. Further, in order to ensure the retaining ability of the retaining member 14, the dimensions of the retaining member 14 cannot be too small, so as to provide adequate frictional grip and support forces for retaining the LED light bar 13. However, the retaining member 14 that occupies a significant amount of space contradicts with the emphasis on thinner form factor in manufacturing.

Figure 2:
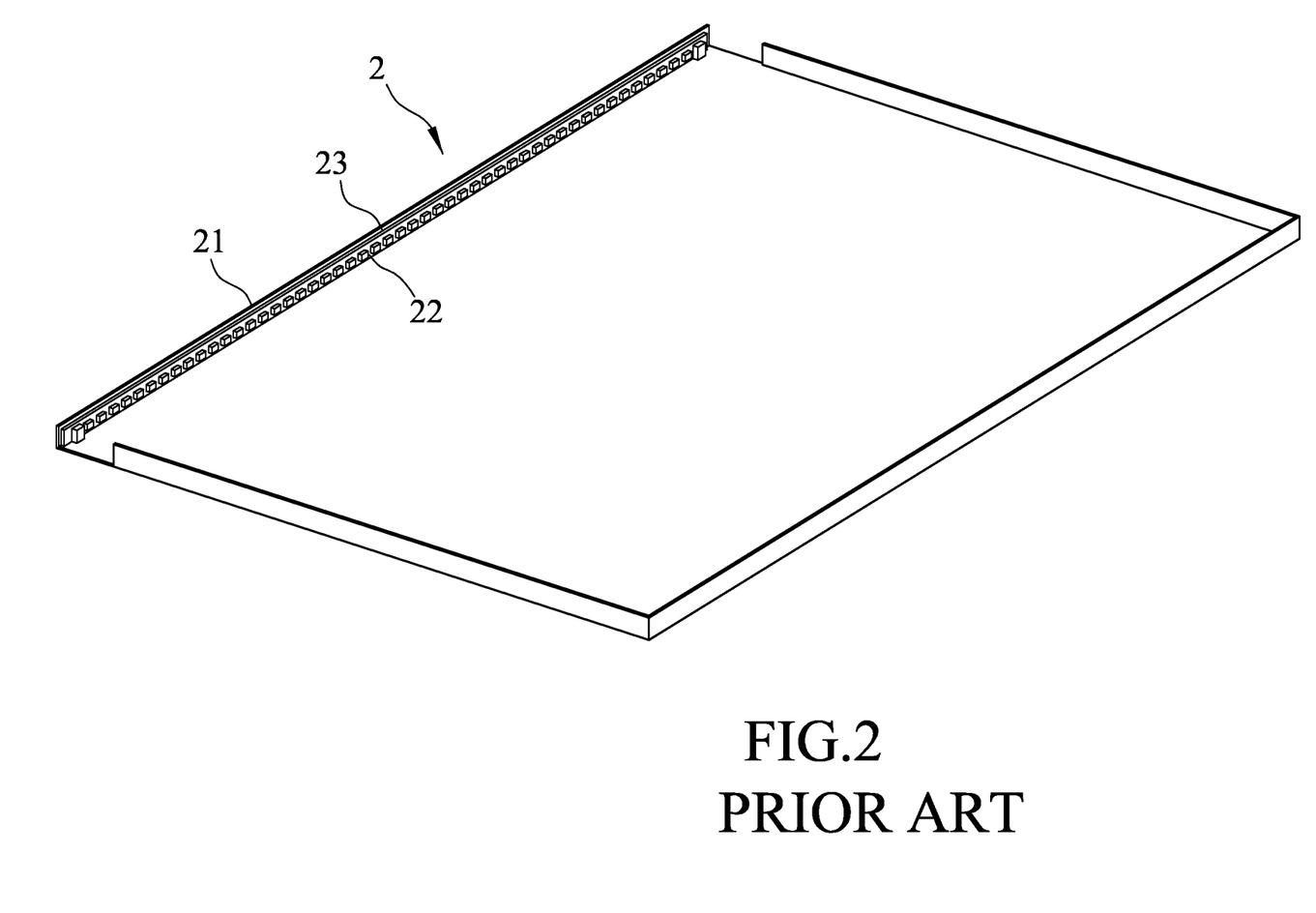
FIG. 2 is a perspective view illustrating a light source module disclosed in Taiwanese patent publication no. 201204982.

In order to save space, products that use adhesive for attachment now appear in the market. FIG. 2 shows a light source module 2 disclosed in Taiwanese patent publication no. 201204982.

The light source module 2 includes a back plate 21, a light bar 22 disposed on the back plate 21, and a double-sided adhesive 23 for adhering the light bar 22 onto the back plate 21. In addition, there are also products that use magnetic attraction, instead of the double-sided adhesive 23. Although the double-sided adhesive 23 or the magnet can help save space as compared to the use of the retaining member 14 (see FIG. 1), the positioning accuracy and the support provided by the double-sided adhesive 23 and the magnet are relatively poor. If external forces are applied, the relative positions between the light bar 22 and the back plate 21 may deviate easily, resulting in adverse conditions such as hot spot. Furthermore, in order to make possible the precise positioning of the light bar 22, use of the double-sided adhesive 23 or magnets requires much manpower for making minor adjustments and calibration, resulting in an increase in labor costs.

SUMMARY OF THE INVENTION

The object of the present invention is to provide a fastener, a light source module and a method for assembling module light source module that are able to alleviate at least one of the above drawbacks of the prior art.

According to one aspect of the present invention, there is provided a fastener. The fastener includes a head portion and a shank portion that extends from the head portion. The shank portion has a distal end that is distal from the head portion and that is formed with at least two bendable anchor segments.

According to another aspect of the present invention, a light source module includes:

a base including a base wall and having a receiving space, the base wall being formed with a fastener hole; and a light emitting bar disposed in the receiving space, the light emitting bar including a base plate, an electrically conducting unit disposed on the base plate, a light emitting component connected electrically to the electrically conducting unit, and a fastener to fasten the base plate to the base wall, the base plate being formed with a through hole, the fastener having a head portion that is disposed in the through hole in the base plate, and a shank portion that extends from the head portion and that extends through the fastener hole in the base wall, the shank portion having a distal end that is distal from the head portion and that is formed with at least two anchor segments, the anchor segments being bent to abut against one side of the base wall that faces away from the light emitting bar.

According to yet another aspect of the present invention, a method of assembling a light source module includes the steps of:

providing a base, a base plate and a fastener, the base including a base wall and having a receiving space, the base wall being formed with a fastener hole, the base plate being formed with a through hole corresponding to the fastener hole, the fastener including a head portion and a shank portion that extends from the head portion, the shank portion having a distal end that is distal from the head portion and that is formed with at least two bendable anchor segments;

extending the fastener through the base plate such that the head portion is disposed in the through hole;

disposing an electrically conducting unit on the base plate such that the electrically conducting unit and the anchor segments are disposed on opposite sides of the base plate;

connecting electrically a light emitting component to the electrically conducting unit, wherein the base plate, the electrically conducting unit, the light emitting component and the fastener cooperate to form a light emitting bar;

disposing the light emitting bar in the receiving space of the base, with the shank portion extended through the fastener hole in the base wall; and bending the anchor segments to abut against one side of the base wall.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
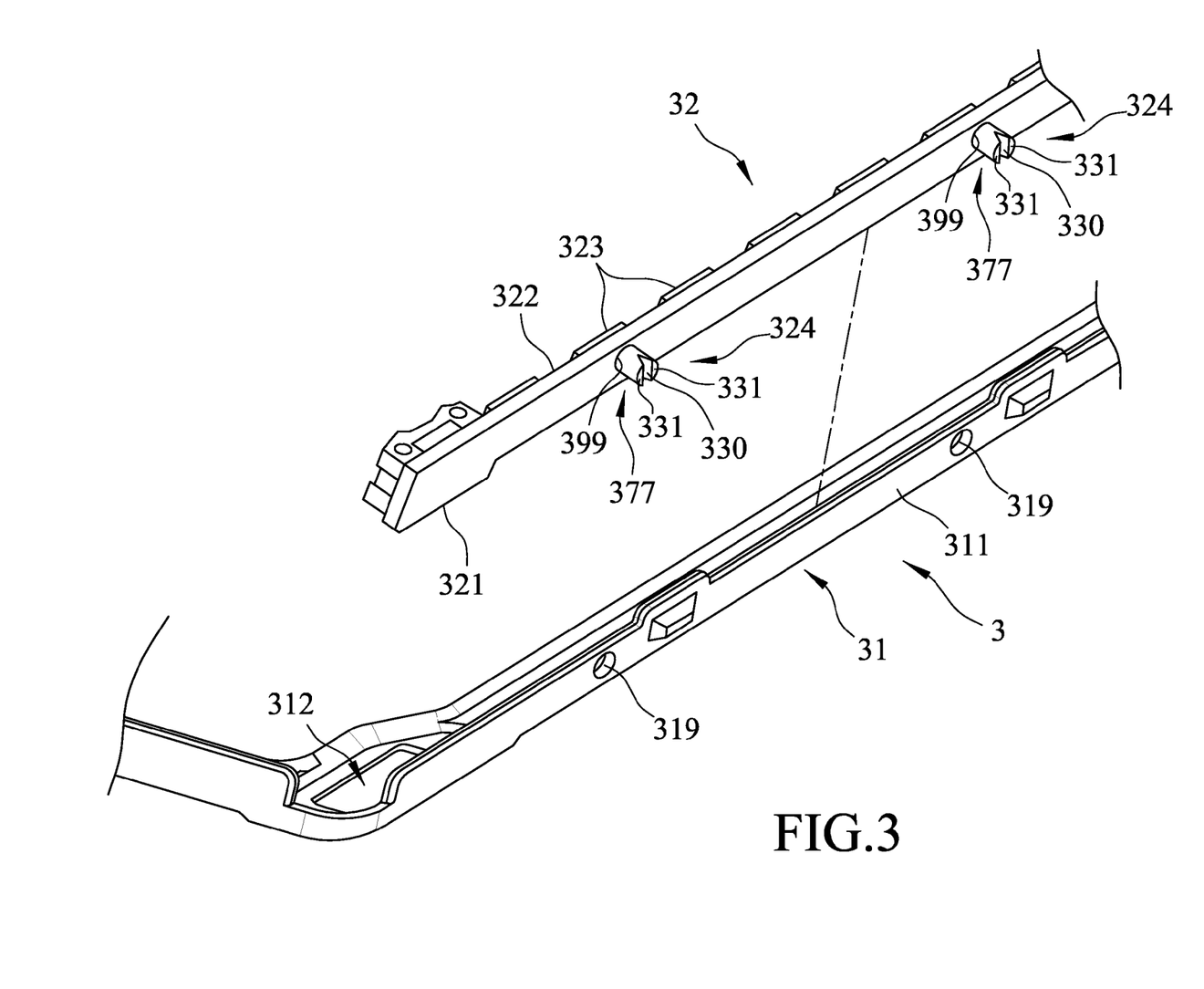
FIG. 3 is a fragmentary exploded perspective view illustrating a preferred embodiment of the light source module of the present invention.

Referring to FIG. 3, the preferred embodiment of a light source module 3 of the present invention is applicable to a liquid crystal display (not shown). The light source module 3 includes a base 31 and a light emitting bar 32.

Figure 4:
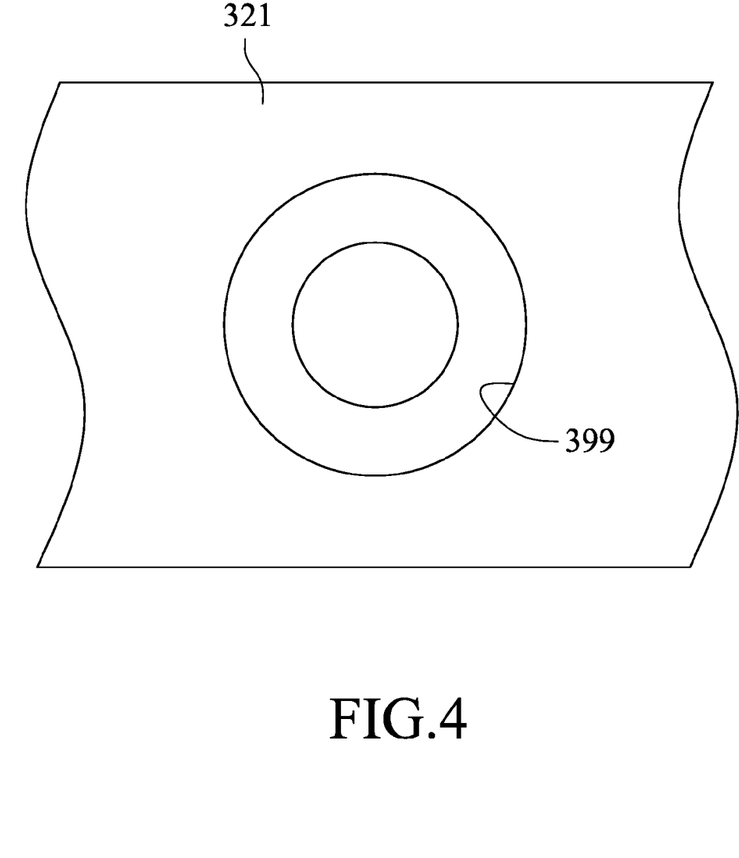
FIG. 4 is a schematic view to illustrate a through hole in the preferred embodiment of the present invention.
Figure 5:
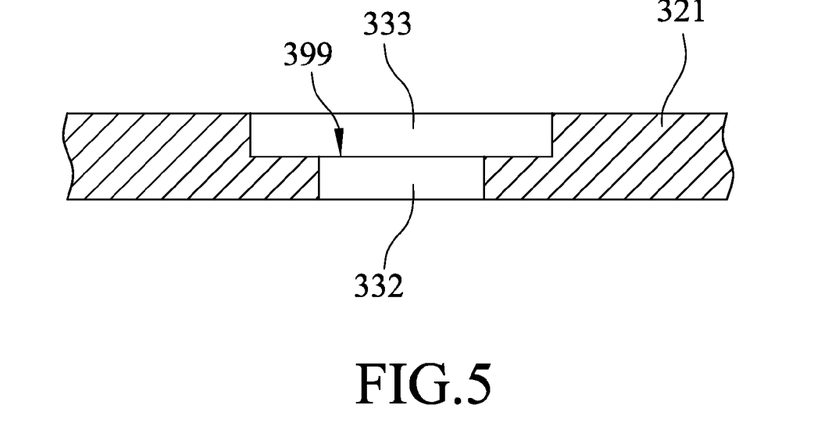
FIG. 5 is a sectional view of FIG. 4.

The base 31 includes a base wall 311 and has a receiving space 312. The base wall 311 is formed with a plurality of fastener holes 319. The light emitting bar 32 is disposed in the receiving space 312 and includes a base plate 321. The base plate 321 is formed with a plurality of through holes 399. The light emitting bar 32 further includes an electrically conducting unit 322 disposed on the base plate 321, a plurality of light emitting components 323 connected electrically to the electrically conducting unit 322, and a plurality of fasteners 324 disposed in the through holes 399 for fastening the base plate 321 to the base wall 311. Each of the through holes 399 corresponds to one of the fastener holes 319 in the base wall 311. Referring to FIGS. 4 and 5, each of the through holes 399 in the base plate 321 has a head retaining section 333 that is proximate to the electrically conducting unit 322, and a shank passage section 332 that extends from the head retaining section 333 and that has a diameter smaller than diameter of the head retaining section 333.

Figure 6:
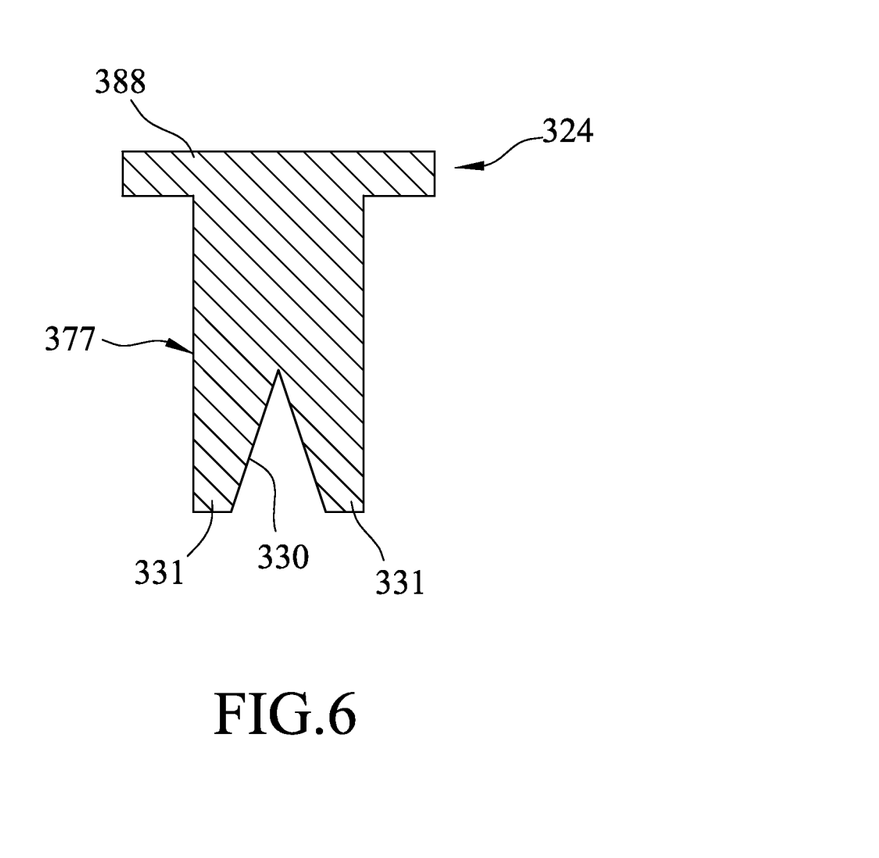
FIG. 6 is a sectional view illustrating a fastener of the preferred embodiment of the present invention.

Referring to FIGS. 3, 5 and 6, each fastener 324 has a head portion 388 that is disposed in the head retaining section 333 of the corresponding through hole 399, and a shank portion 377 that extends from the head portion 388 and that extends through the corresponding fastener hole 319 in the base wall 311. The diameter of each of the head portion 388 is larger than that of the corresponding shank passage section 332. The distal end of the shank portion 377 is formed with a slit 330 that extends toward the head portion 388. The slit 330 configures the shank portion 377 with two anchor segments 331 that are spaced apart from each other, and that are bendable in directions away from the slit 330. The fastener 324 may be made of metal or plastic, or other materials having similar qualities, and the shank portion 377 may be tubular.

Figure 7:
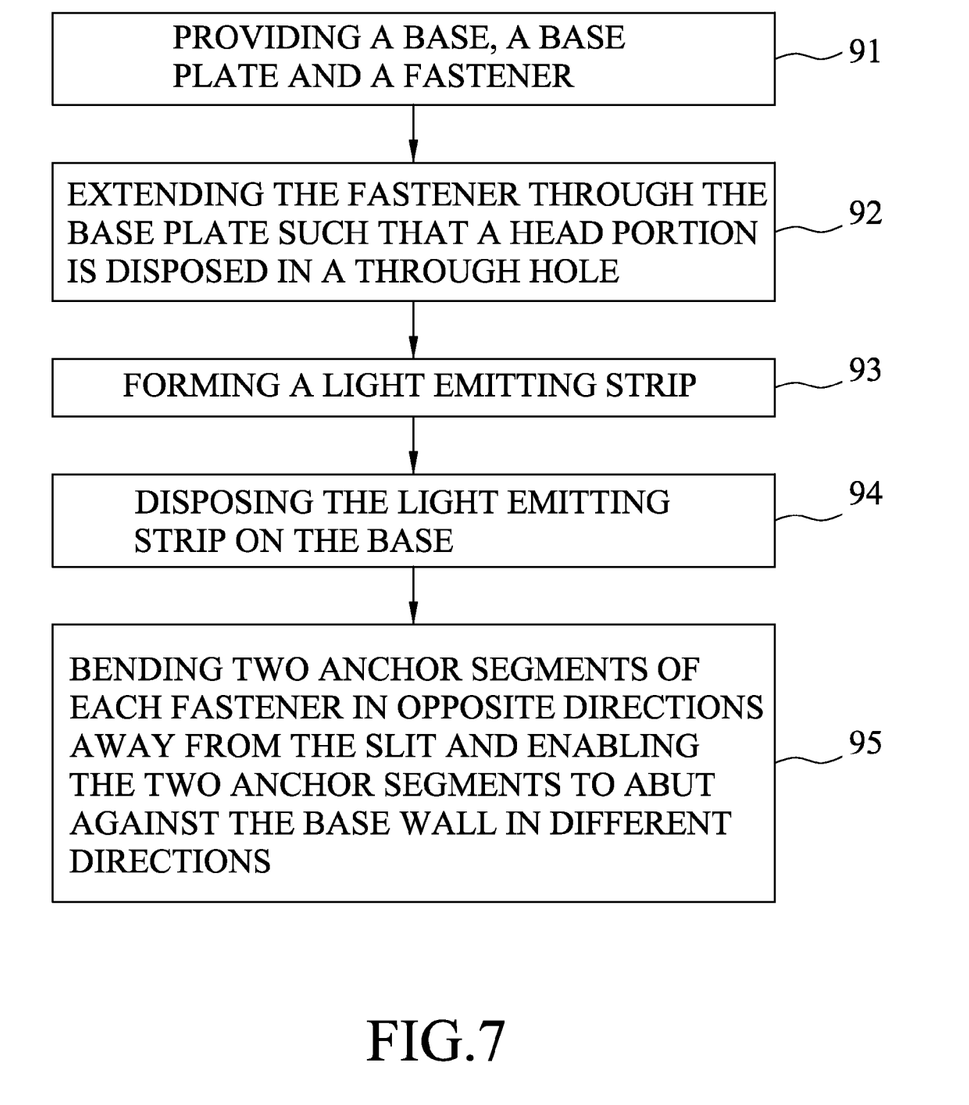
FIG. 7 is a flowchart illustrating a method of assembling a light source module in a preferred embodiment of the present invention.

Referring to FIGS. 3 and 7, a preferred method of assembling the light source module 3 of the present invention includes a step 91 of providing a base, a base plate and a fastener, a step 92 of extending the fastener, a step 93 of forming a light emitting bar, a step 94 of disposing the light emitting bar on the base, and a step 95 of bending anchor segments.

In step 91, the necessary components for assembling the aforementioned light source module 3 are prepared. In step 92, the fastener 324 is extended through the base plate 321 such that the head portion 388 is disposed in the through hole 399.

Figure 8:
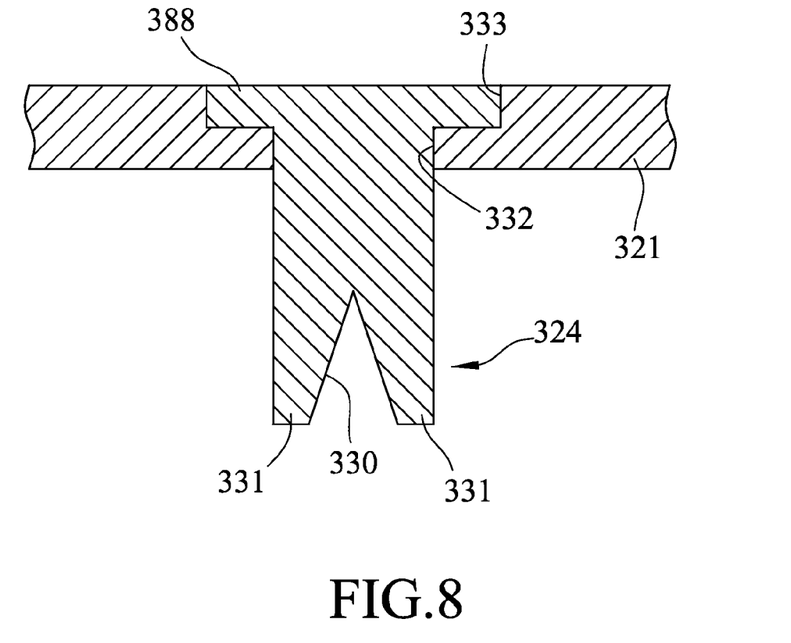
FIG. 8 is a sectional view illustrating a step of extending the fastener being inserted through a through hole.

Referring to FIGS. 7 and 8, since the diameter of the head portion 388 of each of the fasteners 324 is larger than the diameter of a the corresponding shank passage section 332, each fastener 324 can be retained on the base plate 321 in step 92.

Figure 9:
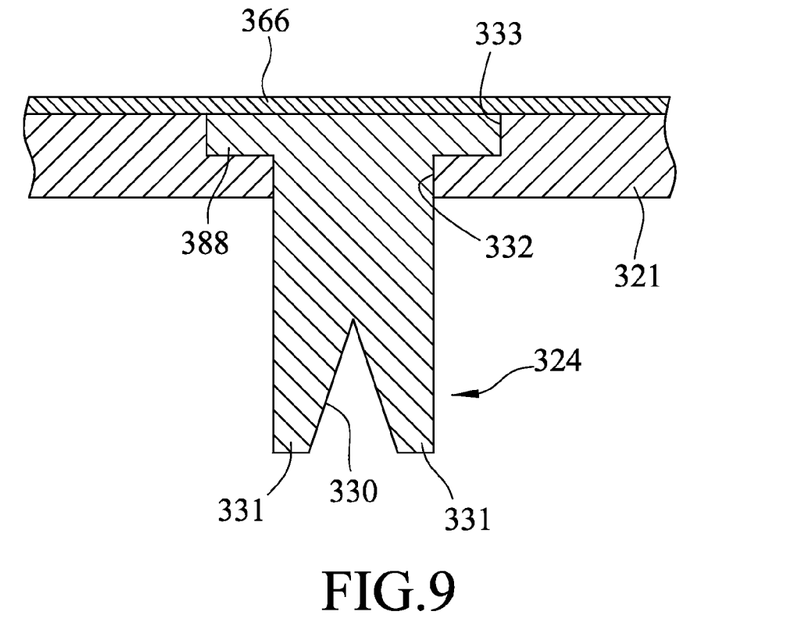
FIG. 9 is a sectional view illustrating a step of disposing a first insulation layer on a base plate.
Figure 10:
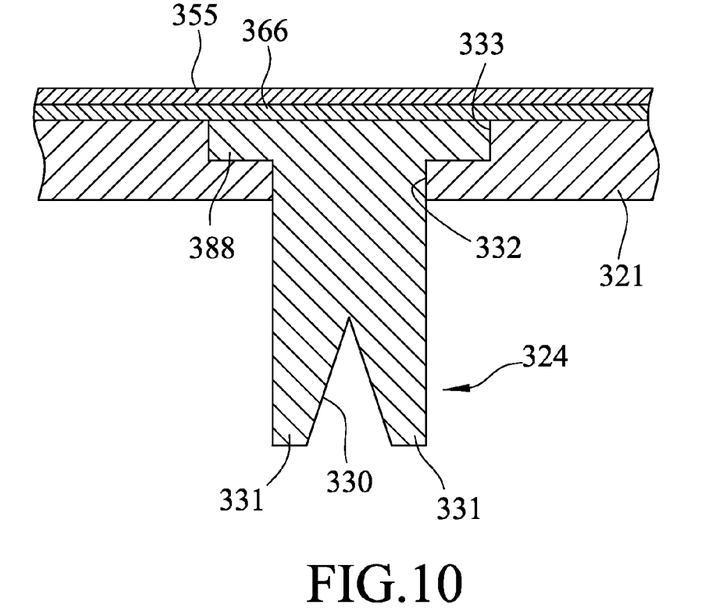
FIG. 10 is a sectional view illustrating a step of disposing an electrical conducting layer disposed on the base plate.
Figure 11:
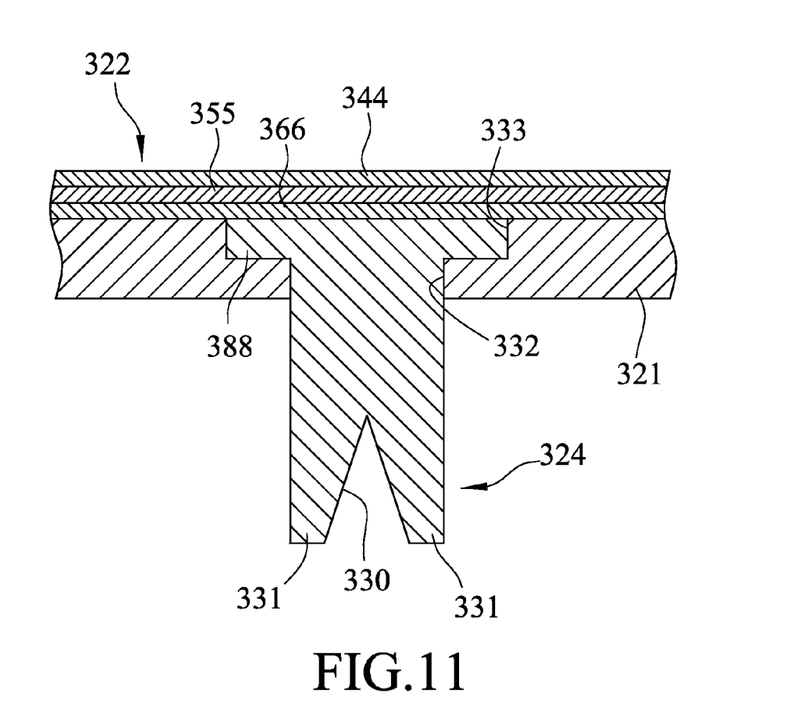
FIG. 11 is a sectional view illustrating a step of disposing a second insulation layer on the base plate.
Figure 12:
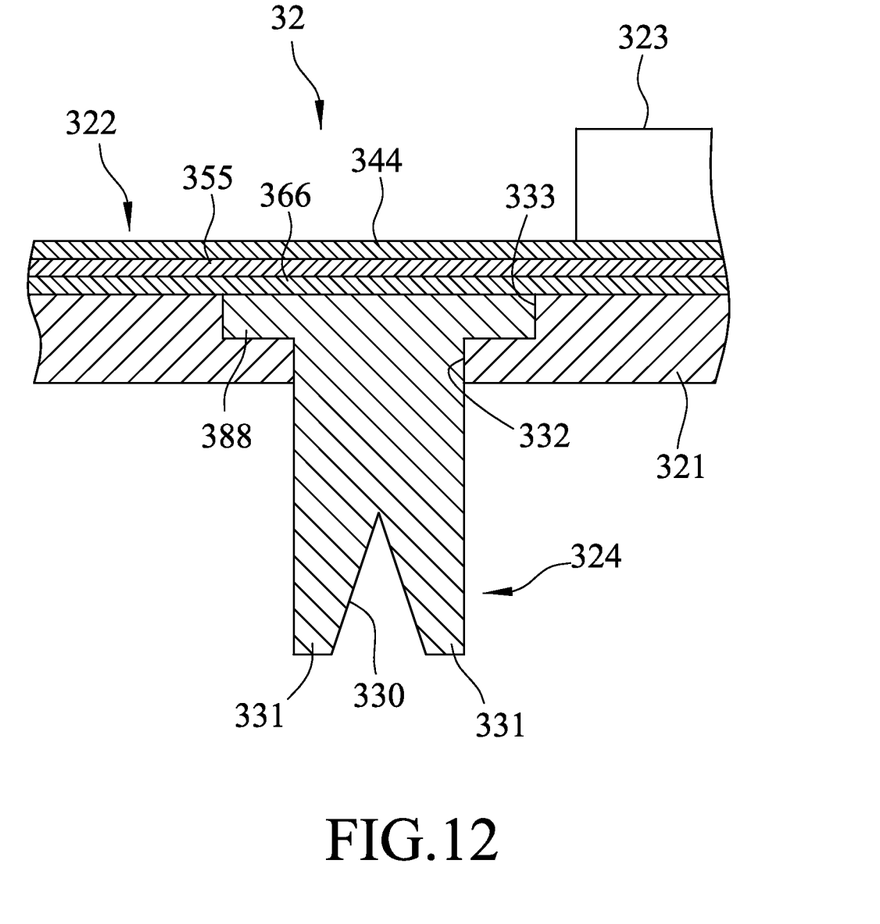
FIG. 12 is a sectional view of the preferred embodiment illustrating a light emitting component electrically connected with the electrical conducting layer.

Referring to FIGS. 7, 9, 10 and 11, the step 93 involves disposing the electrically conducting unit 322 on the base plate 321, which includes disposing a first insulation layer 366 on the base plate 321, disposing an electrical conducting layer 355 on the first insulation layer 366, and disposing a second insulation layer 344 on the electrical conducting layer (shown in FIGS. 9-11). The electrically conducting unit 322 covers the head portions 388 of the fasteners 324 at this time. Referring to FIG. 12, the light emitting components 323 are disposed on the second insulation layer 344 and are connected electrically to the electrical conducting layer 355 (for illustration purposes, only one light emitting component 323 is shown in FIG. 12), such that the light emitting components 323, the first insulation layer 366, the electrical conducting layer 355 and the second insulation layer 344 are located on one side of the base plate 321, and the anchor segments 331 of the fasteners 324 are located on the other side of the base plate 321. Accordingly, the base plate 321, the first insulation layer 366, the electrical conducting layer 355, the second insulation layer 344, the light emitting components 323 and the fastener 324 are assembled to form a light emitting bar 32. In this preferred embodiment, the light emitting components 323 are light emitting diodes, and the base plate 321 is a printed circuit board (PCB).

Figure 13:
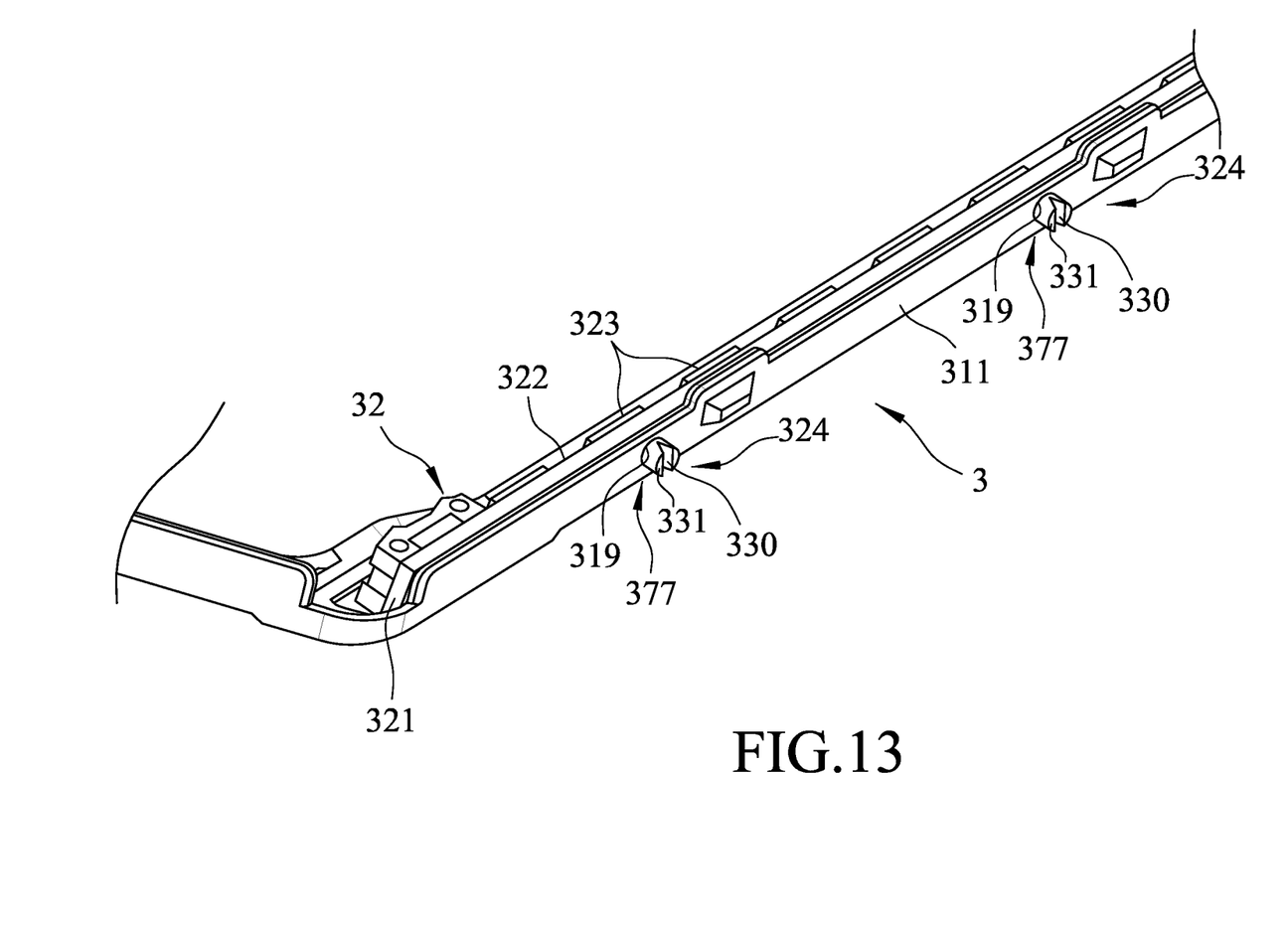
FIG. 13 is a fragmentary perspective view of the preferred embodiment, illustrating a light emitting bar disposed in a receiving space of a base.
Figure 14:
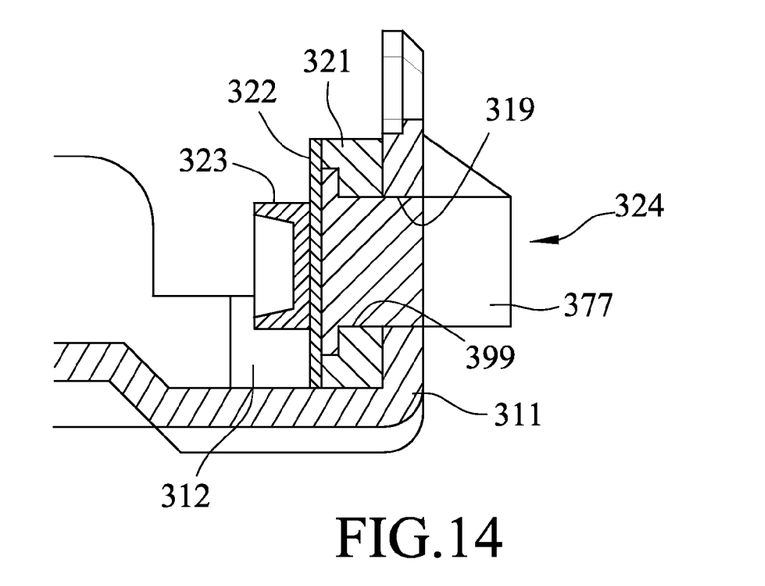
FIG. 14 is a fragmentary sectional view illustrating the fastener being inserted through the through hole.

Referring to FIGS. 7, 13 and 14, step 94 involves disposing the light emitting bar 32 in the receiving space 312 of the base 31, with the shank portion 377 of each fastener 324 extended through the corresponding fastener hole 319 in the base wall 311. In detail, the operator first aligns the shank portion 377 of each fastener 324 with the corresponding fastener hole 319 in the base wall 311. After the shank portions 377 are passed through the fastener holes 319, the light emitting components 323 and the electrically conducting unit 322 on the base plate 321 are disposed in the receiving space 312. As a result, each shank portion 377 will pass through the corresponding fastener hole 319 and extend beyond the base wall 311.

Figure 15:
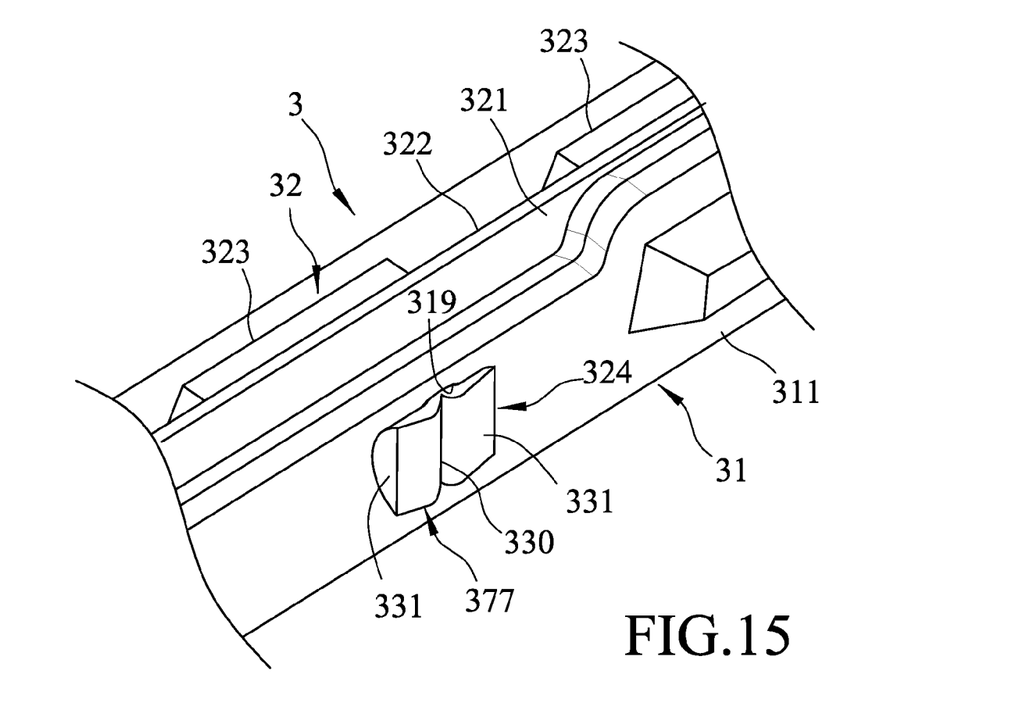
FIG. 15 is a fragmentary perspective view illustrating two anchor segments of the fastener bent to abut against the base wall.

Finally, referring to FIGS. 7 and 15, in step 95, the operator bends the two anchor segments 331 of each fastener 324 in opposite directions away from the slit 330. This enables the two anchor segments 331 to abut against the base wall 311 in different directions, thus fixing the light emitting bar 32 on the base wall 311.

It should be noted that, the numbers of the fastener holes 319, the through holes 399 (see FIG. 14), the light emitting components 323 and the fasteners 324 are not limited to those shown in the drawings, and may be adjusted based on actual requirements.

Further, in this preferred embodiment, the shank portion 377 of each fastener 324 has a slit 330 and two anchor segments 331 that are spaced apart from each other and are configured by the slit 330. In practice, there can be more than two slits 330 that configure pairs of the anchor segments 331. As long as the anchor segments 331 can be bent in different directions and abut against the base wall 311, the light emitting bar 32 can be fixed to the base wall 311.

Figure 16:
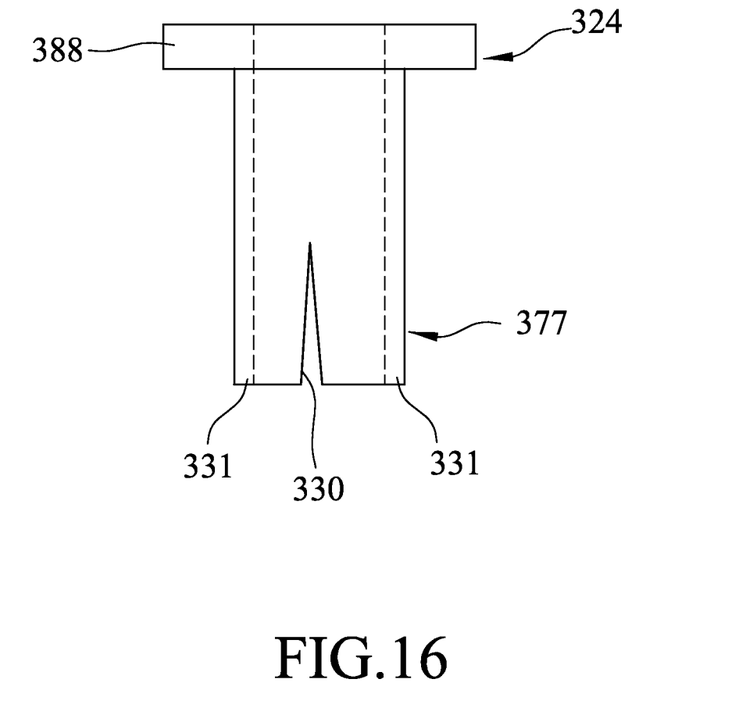
FIG. 16 is a side view illustrating a modified fastener in the preferred embodiment of the present invention.

Referring to FIG. 16, each fastener 324 (or the shank portion 377 thereof) may be hollow for material cost reduction and allowing easier bending of the anchor segments 331.

The light source module and the method of assembling the same described hereinabove possess the following advantages:

(a) Positioning Accuracy:

In the present invention, when manufacturing the base 31, the fastener holes 319 can be first formed in the base wall 311. Therefore, precise measurements can be performed in terms of position and dimension of each fastener hole 319. By such virtue, manufacturing steps can be reduced, and the relative positions of the components of the light source module 3 can be maintained such that deviation of the light guided by the light source module 3 can be reduced.

(2) Strong and Stable Fastening:

The fasteners 324 fasten the light emitting bar 32 to the base 31 by mechanical forces, thus providing a strong and stable fastening. Further, by the pressing of the two anchor segments 331, contact area with the base wall 311 is increased, thereby significantly enhancing the fastening effect. Even when external forces are applied, the relative positions of the components of the light source module 3 are not easily affected.

(3) Assembly Convenience:

In the forming of the fastener holes 319 in the base wall 311, or the forming of the through holes 399 in the base plate 321, precise positioning can be achieved with simple and straightforward manufacturing process. When assembling, the anchor segments 331 are inserted through the fastener holes 319 and bent in the opposite directions to abut against the base wall 311 indifferent directions to fix the light emitting bar 32 on the base wall 311. Such simple assembling process provides assembly convenience, and substantially reduces the consumption of manpower and manufacturing time.

(4) Reduced Damage to the Light-Emitting Diodes:

Screwing is not needed and drilling holes is not required in the present invention, which result in a smaller amount of debris. Therefore, short circuit situations among the light-emitting diodes are unlikely to occur. At the same time, hot spots due to uneven adhesion when using double-sided adhesive can be avoided, thus improving the manufacturing quality of the light source module 3.

(5) Space Saving:

The assembled light emitting bar 32 and base 31 does not occupy more space compared to the unassembled light emitting bar 32 and base 31. Therefore, the space occupied by the light source module 3 can be reduced to provide for a thinner form factor.

(6) Wide Applicability:

As components used in the invention are not complicated, the invention is not only applicable to backlight modules of liquid crystal displays, but can also be used in light-emitting diode modules of general lighting devices, monitoring devices, televisions, and other products related to light-emitting diodes. From the point of view of commercial production, there can be huge economic benefits due to such wide applicability. Further, the number of fasteners 324 can be adjusted according to different applications, thus providing good flexibility.

(7) Heat Dissipation:

After the light source module 3 is assembled, the light emitting bar 32 is in close contact with the base wall 311, so that heat from the light emitting bar 32 can be directly dissipated to the base 31, thereby providing good heat dissipation.

In summary, through the use of fasteners 324 and fastener holes 319 in the base wall 311, a more convenient, faster, and more stable assembling process is made possible while enhancing the light quality outputted from the light source module 3 and reducing the space required by the light source module.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of assembling a light source module, comprising the steps of:
   providing a base, a base plate and a fastener, the base including a base wall and having a receiving space, the base wall being formed with a fastener hole, the base plate being formed with a through hole corresponding to the fastener hole, the fastener including a head portion and a shank portion that extends from the head portion, the shank portion having a distal end that is distal from the head portion and that is formed with at least two bendable anchor segments;
   extending the fastener through the base plate such that the head portion is disposed in the through hole;
   disposing an electrically conducting unit on the base plate such that the electrically conducting unit and the anchor segments are disposed on opposite sides of the base plate;
   connecting electrically a light emitting component to the electrically conducting unit, wherein the base plate, the electrically conducting unit, the light emitting component and the fastener cooperate to form a light emitting bar;
   disposing the light emitting bar in the receiving space of the base with the shank portion extended through the fastener hole in the base wall; and
   bending the anchor segments to abut against one side of the base wall, wherein the step of disposing the electrically conducting unit on the base plate includes disposing a first insulation layer on the base plate, disposing an electrical conducting layer on the first insulation layer, and disposing a second insulation layer on the electrical conducting layer, the light emitting component being connected electrically to the electrical conducting layer, wherein the electrically conducting unit covers the head portion of the fastener.

2. The method as claimed in claim 1, wherein the anchor segments are bent in different directions.

3. The method as claimed in claim 2, wherein the distal end of the shank portion is formed with a slit that extends toward the head portion, the slit configuring the shank portion with the anchor segments that are being spaced apart from each other, the anchor segments being bent in directions away from the slit.

4. A light source module comprising:

a base including a base wall and having a receiving space, said base wall being formed with a fastener hole; and a light emitting bar disposed in said receiving space, said light emitting bar including a base plate, an electrically conducting unit disposed on said base plate, a light emitting component connected electrically to said electrically conducting unit, and a fastener to fasten said base plate to said base wall, said base plate being formed with a through hole, said fastener having a head portion that is disposed in said through hole in said base plate, and a shank portion that extends from said head portion and that extends through said fastener hole in said base wall, said shank portion having a distal end that is distal from said head portion and that is formed with at least two anchor segments, said anchor segments being bent to abut against one side of said base wall that faces away from said light emitting bar, wherein said through hole in said base plate has a head retaining section that is proximate to said electrically conducting unit, and a shank passage section that extends from said head retaining section and that has a diameter smaller than diameters of said head portion and said head retaining section, said head portion being received in said head retaining section, said electrically conducting unit including a first insulation layer disposed on said base plate, an electrical conducting layer disposed on said first insulation layer, and a second insulation layer disposed on said electrical conducting layer, said light emitting component being connected electrically to said electrical conducting layer, wherein said electrically conducting unit covers said head portion of said fastener.

5. The light source module as claimed in claim 4, wherein said distal end of said shank portion is formed with a slit that extends toward said head portion, said slit configuring said shank portion with said anchor segments that are spaced apart from each other, said anchor segments being bent in directions away from said slit.

6. The light source module as claimed in claim 4, wherein said fastener is tubular.

7. The light source module as claimed in claim 4, wherein said base plate is a printed circuit board, and said light emitting component is a light emitting diode.

* * * * *